Sept. 15, 1959  J. J. DALEY ET AL  2,904,184
FILTERING UNIT
Filed July 1, 1957

JAMES J. DALEY
VERNON M. TULL
INVENTOR.

BY Lawrence J. Winter
ATTORNEY

United States Patent Office 2,904,184
Patented Sept. 15, 1959

2,904,184

FILTERING UNIT

James J. Daley, Elizabeth, and Vernon M. Tull, Nixon, N.J., assignors to Purolator Products, Inc., Rahway, N.J., a corporation of Delaware Application July 1, 1957, Serial No. 669,185

3 Claims. (Cl. 210—323)

The present invention relates to filters and more particularly to industrial or bulk type filters which are large capacity filters generally having a number of filter cartridges disposed therein through which the fluid to be filtered passes.

An object of the present invention is to provide novel sealing means for an industrial or bulk type filter unit which seals the ends of the filter cartridges disposed in the filter unit.

Another object of the present invention is to provide a universal sealing means for sealing the ends of a plurality of filter cartridges disposed in a bulk filter unit which compensates for vertical and horizontal misalignment of the filter cartridges in the filter unit housing. This may be caused by the fact that all the filter cartridges are not precisely the same length due to shortcomings in the manufacturing of them, or because of slight misalignment of the cover plate on the filter housing.

A still further object of the present invention is to provide novel sealing means for the ends of the filter cartridges disposed within a bulk type filter unit which eliminates the need for individual sealing means for each cartridge therein, such as an individual tie rod, spring clamp, sealing cup and bolt member normally used for sealing a filter cartridge of a bulk type filter unit.

Yet, another object of the present invention is to provide novel sealing means for the filter cartridges disposed in a bulk type filtration unit which automatically adjusts itself for misalignment of the filter cartridges in the unit caused by differences in the length of the filter cartridges or the positioning of the cartridges on non-flat surfaces.

The present invention further provides sealing means for the individual cartridges of a bulk type filtration unit which permit greater leeway in the machine tolerances required in the manufacturing thereof.

The present invention further provides novel sealing means for filter cartridges which permits the proper sealing of the cartridges in the field by unskilled labor and in a shorter time then required heretofore.

The invention will be better understood from the following description when considered in connection with the accompanying drawing forming a part thereof and in which.

Figure 1:
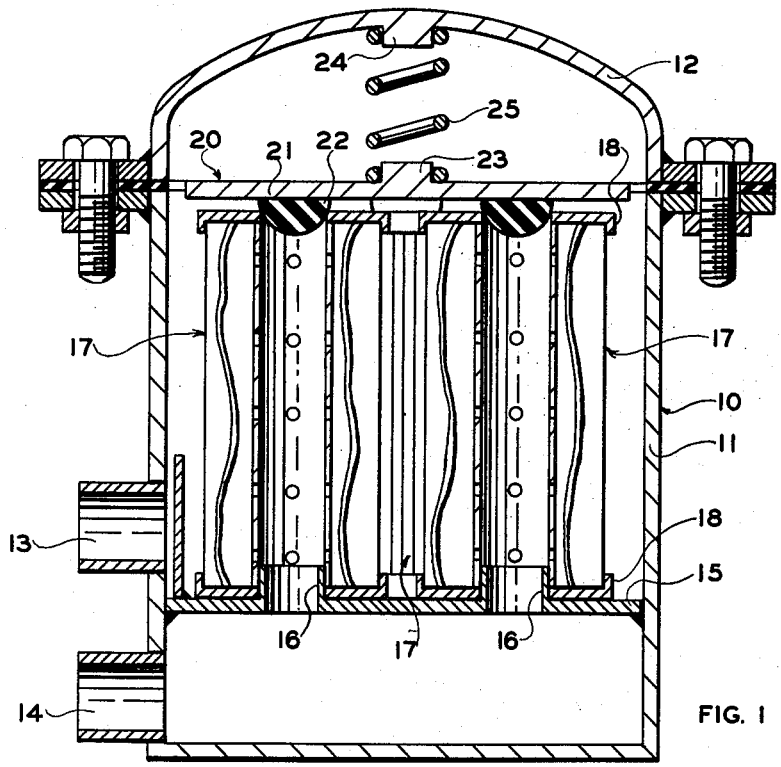
Fig. 1 is a cross-sectional view of a filter unit embodying the invention.
Figure 2:
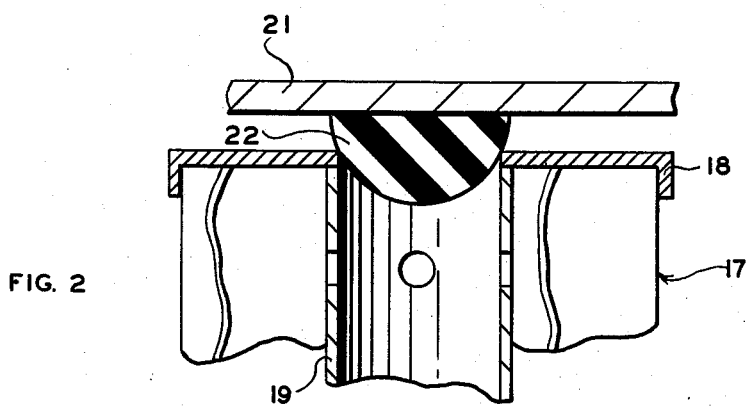
Fig. 2 is a fragmentary enlarged detail view showing the sealing means embodied in the present invention.

Referring to the drawings, the reference numeral 10 designates a bulk filtration unit comprising a cylindrical vessel 11 provided with an inlet 13 and an outlet 14 in the lower portion thereof having a dish shaped closure member 12 bolted to the top thereof.

A circular division plate 15 is welded to the inner surface of the vessel 11 between inlet 13 and outlet 14 provided with sleeves or bushings 16 which extend above plate 15 for mounting annular filter elements or cartridges 17 thereon. Filter cartridges 17 are formed of conventional resin-impregnated pleated paper having radially extending convolutions with the opposite ends thereof sealed by end caps 18. A perforated metal center tube 19 is disposed centrally of the pleats.

The filter elements are disposed within the vessel 11 by inserting the center tubes 19 over the bushings 16 so that the lower end cap seats on the top of the division plate 15.

The upper end of the filter cartridges 17 are sealed by a sealing member 20 comprising a circular plate 21 having a plurality of hemispherical shaped balls or gaskets 22 cemented to the underside thereof. Hemispherical gaskets 22 are spaced laterally of one another in alignment with the bushings 16 in division plate 15 and are adapted to extend within the upper ends of the filter cartridge center tubes 19. The upper surface of plate 21 is provided with a centrally disposed projection or protuberance 23 thereon while a centrally disposed projection 24 is provided on the inner surface of closure member 12. A compression spring member 25 has the opposite ends thereof mounted on projections 23 and 24 so that when the closure member 12 is bolted on vessel 11 the spring will maintain a force against plate 21 thereby causing the hemispherical balls 22 to seat in the cartridge center tube. This provides a fluid tight seal for the center tubes of the individual cartridges 17 to prevent fluid being filtered from by-passing the filter elements. Spring member 25 also maintains the lower ends of the cartridges seated in a fluid tight relationship against the surface of plate 15 to prevent fluid from by-passing the filter cartridges. Should the filter cartridges 17 be of unequal lengths so that plate 21 is tilted at an angle to the horizontal plane passing through the cartridges, the symmetrical surface of the hemispherical balls 22 will compensate for this misalignment and still permit the balls to properly seal off the center tubes of the cartridges.

Thus, the present invention provides a sealing device which will properly seal the filter cartridges in a bulk filtration unit should the closure member be slightly misaligned when it is bolted thereto, or should slight misalignment occur because of the different lengths of cartridge elements used therein or misalignment of the division plate 15 within the vessel.

In addition, the sealing means of the present invention provides a proper seal for a bulk filtration unit having a plurality of filter cartridges therein of simple construction and which permits unskilled labor to replace the filter cartridges therein when necessary.

Inasmuch as various changes may be made in the form, location and relative arrangement of the several parts without departing from the essential characteristics of the invention, it will be understood that the invention is not to be limited except by the scope of the appended claims.

What is claimed is:

1. A filter unit comprising a casing having an inlet and outlet therein for flowing fluid to be filtered therethrough, a partition having a plurality of openings therein separating said inlet and outlet, means for mounting a filter cartridge on said partition adjacent each of said openings, an annular convoluted pleated paper filter cartridge mounted over each opening, and seated against said partition a center tube in each cartridge in alignment with each said opening, and sealing means for sealing the end of each said center tube opposite said partition comprising a plate member, hemispherically shaped projections on the underside of said plate extending into each said center tube to form a fluid tight joint therewith, and biasing means for maintaining each of said projections abutting each of said center tubes and said filter elements seated on said partition.

2. A filter unit comprising an open end cylindrical casing having an inlet and outlet therein, a detachable closure member for covering said open end, a circular partition extending horizontally of said casing to separate said inlet and outlet, said partition having a plurality of upwardly extending sleeves disposed thereon to form passages in said partition, a filter cartridge mounted on each of said sleeves to seat against said partition, each of said cartridges comprising annular convoluted pleated paper elements having centrally disposed center tubes extending therethrough, a circular plate member positioned above said filter cartridges, a plurality of resilient hemispherical shaped protuberances on the lower surface of said plate member, each of said protuberances adapted to fit within the end of one of said center tubes to form a seal therewith, and biasing means disposed between said closure member and plate member to force each of said protuberances into one of said center tubes and to maintain each of said cartridges seated on said partition.

3. A filter unit comprising a casing having an inlet and outlet for flowing fluid to be filtered therethrough, a partition fixed to the inner casing walls between said inlet and outlet, annular filter elements with center tubes extending therethrough, one end of each said filter element and center tube being seated on said partition so incoming fluid flows therethrough before being discharged through said outlet, and sealing means for the opposite end of each of said filter elements comprising a plate member with hemispherical projections thereon, said projections being disposed in each said center tube to provide a seal therefor, and means for holding said plate member and projections in sealing relationship with said center tubes.

References Cited in the file of this patent

UNITED STATES PATENTS

| 666,044 | Barr | Jan. 15, 1901 |
| 1,812,916 | Zerk | July 7, 1931 |
| 2,364,820 | Rosander et al. | Dec. 12, 1944 |
| 2,507,125 | Townsend | May 9, 1950 |
| 2,696,915 | Kasten et al. | Dec. 14, 1954 |

FOREIGN PATENTS

| 834,237 | France | Aug. 8, 1938 |